United States Patent [19]

McCullough, Jr.

[11] Patent Number: 5,509,986
[45] Date of Patent: Apr. 23, 1996

[54] PROCESS FOR PREPARING AN IGNITION RESISTANT CARBONACEOUS MATERIAL COMPRISING A MELT BLOWING OR SPUNBONDING STEP, A RADIATION STEP AND A CARBONIZING STEP

[75] Inventor: Francis P. McCullough, Jr., Lake Jackson, Tex.

[73] Assignee: The Dow Chemical Company, Midland, Mich.

[21] Appl. No.: 294,239

[22] Filed: Aug. 22, 1994

[51] Int. Cl.$^6$ .............. D04H 3/16; D01C 5/00; C01B 31/00; D29C 47/88
[52] U.S. Cl. .......... 156/167; 156/181; 156/273.3; 264/29.2; 264/29.6; 264/211.12; 264/488
[58] Field of Search .................. 264/29.2, 22, 29.6, 264/211.12; 156/181, 73.1, 273.3, 167; 423/447.4, 447.7, 447.2

[56] References Cited

U.S. PATENT DOCUMENTS

| | | |
|---|---|---|
| 4,698,189 | 10/1987 | Tetzlaff ................. 264/22 |
| 4,902,561 | 2/1990 | McCullough, Jr. et al. ......... 428/280 |
| 4,981,751 | 1/1991 | Daumit et al. ................. 423/447.1 |
| 5,399,423 | 3/1995 | McCullough et al. ............ 264/211.12 |

*Primary Examiner*—James D. Withers

[57] ABSTRACT

A process for preparing an ignition resistant carbonaceous material by exposing a meltblown or spunbonded acrylic precursor material in the form of at least one ply of a generally planar fibrous web, matt or batt to ionizing radiation to crosslink said acrylic material which is then heat treated in an inert atmosphere to increase the carbon content of said irradiated material to form said carbonaceous material. The invention also resides in a continuous self bonded fibrous carbonaceous material having a carbon content of from about 65% to less than about 92%, an oxygen content of less than about 2%, and a specific resistivity of from about $10^{-1}$ to about $10^{-10}$ ohm-cm. Preferably said carbonaceous material has an oxygen content of less than about 1% and a nitrogen content of from about 5% to about 30%.

11 Claims, 1 Drawing Sheet

PROCESS FOR PREPARING AN IGNITION RESISTANT CARBONACEOUS MATERIAL COMPRISING A MELT BLOWING OR SPUNBONDING STEP, A RADIATION STEP AND A CARBONIZING STEP

FIELD OF THE INVENTION

The present invention relates to a process for preparing a novel continuous, generally planar, sheet like, carbonaceous material comprised of a multiplicity of interconnected, carbonaceous fibers having a multiplicity of contact points, said fibers being integrally welded at their contact points to form said continuous, generally planar, sheet like, carbonaceous material. The carbonaceous material has a moderate to high specific resistivity, an oxygen content of less than about 2%, a carbon content of less than 92%, and a nitrogen content of from 5 to 30% and can take a variety of physical forms, including a planar, sheet like batting, fabric, panel, web, mat, and the like.

In the process, the carbonaceous material is prepared from a meltbonded or spunbonded thermoplastic polymeric precursor material. This polymeric precursor material is in the form of a multiplicity of fibers which, while in a heat softened and tacky condition, contact and adhere to each other at their contact points, thus forming a fibrous mat, web, or the like. The thus formed interconnected fibrous polymeric precursor material is then irradiated to crosslink the polymeric precursor material and heat treated in a nonoxidizing atmosphere to permanently heat set and carbonize the polymeric precursor material. The carbonaceous material of the invention provides ignition resistant, fireblocking, and thermal insulative materials.

BACKGROUND OF THE INVENTION

Textile materials can be made into a variety of different physical forms, including fibers per se, a fiber assembly such as a fiber tow, mat, web, or the like. Textile materials are further exemplified in a variety of fibrous textile structures including traditional textile fibers and fabrics and microfibrous mats, webs, or the like.

The Textile Institute defines a fabric as "a manufactured assembly of fibers and/or yarns, which has substantial area in relation to its thickness and sufficient mechanical strength to give the assembly inherent cohesion". Traditional textile fabrics are most commonly woven or knitted, but the term includes assemblies produced by lace-making, tufting, felting, net-making, and so called nonwoven processes. The distinctive characteristics of a fabric arises from the manner in which the fibers are arranged in a sheet-like or planar structure. Woven and knitted fabrics are made by interlacing and interlooping of assemblies of filaments or fibers (monofilament, or multifilaments with staple yarns). On the other hand, traditional nonwoven fabrics are made by blending staple fibers with a polymeric binder material followed by bonding to form a web-like array of fibers or filaments or, alternatively, mechanically entangling the fibers such as by hydroentanglement or lock stitching (needle punching) to form a mechanically entangled web-like array. The web-like array can be made from fibers of discreet lengths (ranging from a few millimeters to a few meters) by a carding or wet laying process.

An alternative to traditional nonwoven processes for the production of microfibrous materials consists of laying or blowing filaments as they are melt extruded. The microfibrous material made by these latter processes are commonly known as spunbonded and meltblown nonwoven fabrics.

The term "fibrous material" as used herein refers to a multiplicity of randomly entangled self bonded polymeric precursor fibers or microfibers in the form or shape of a nonwoven generally planar panel, sheet, mat, web, batting, or the like. It will be apparent to persons ckilled in the art that the final shape of the randomly entangled self bonded polymeric precursor fibers or microfibers can be made to any desired specification, be it pillow shaped, rod like or the like. The fibrous material is produced using either the meltblown or spunbond process or some modification or combination thereof.

The exact final structural form of the microfibrous material can also be tailored by controlling the process depending upon the desired loft and density of the material required, i.e. a relatively thick, low density mat or a relatively thin, higher density mat. The fibrous material can also be in the form of a single ply mat or web, or a multiplicity of superimposed or stacked plies in the form of a high loft mat or batt-like structure. In other words, a spunbonded fabric can be defined generically as a continuous interconnected polymeric microfibrous fabric or material. A melt blown fabric is defined by a process in which extremely fine or "super fine" microdenier fibers of typically less than 10 microns in diameter are extruded under the influence of a dynamic flow of air and are then collected in the form of a microfibrous material on a screen or belt. As a result of the dynamic air flow, the fibers are drawn while they are still hot and tacky, so that there is obtained a difference in birefringence, crystallinity and molecular orientation as compared to conventionally spun fibers. The microdenier fibers produced in a meltblown process are much finer than those that can be produced by the traditional textile techniques of melt spinning or other traditional methods of spinning textile fibers. The meltblown microdenier fibers are bonded at the fiber to fiber intersections and contact points while the fibers are still tacky. Typical melt blown fibrous materials are usually thin, but it is possible by placing multiple extrusion heads in a close series relationship to build up an interconnected (bonded) mat or batt, for example, having a thickness of from 0.1 to 6 inches (2.5 to 150 mm), which is similar in thickness to the thick batts produced from textile fibers using a traditional air-laid process. The birefrigence of meltblown and spunbonded fibers is relatively low. Meltblown fibers exhibit a lower level of birefringence than the spunbonded fibers which in turn exhibit a lower level of birefringence than traditional spun and drawn textile fibers.

The extremely fine diameter of meltblown microfibers yields a microfibrous material with a surface area of from 4 to 20 times the surface area of similar weight fibrous material containing traditional textile fibers. This phenomenon greatly increases the thermal insulation property of a meltblown polymeric microfibrous material, but, at the same time, also greatly increases the flammability of the material. For this reason, a meltblown microfibrous material is usually covered or coated on the fiber surfaces by another ignition resistant material to reduce or prevent ignition.

Processes for preparing microfibrous materials from thermoplastic materials using a meltblown process have been described in publications such as Industrial and Engineering Chemistry, Vol. 48, No. 8 (1956), pages 1342–1346. Meltblown processes are also described in U.S. Pat. Nos. 2,374, 540 and 3,532,800. Methods for preparing spunbonded articles are described in U.S. Pat. Nos. 3,379,811 and 3,502,763.

U.S. Pat. No. 4,118,531, which is incorporated herein by references, discloses meltblown webs that comprise a mixture of meltblown microfibers and crimped bulking fibers wherein the mixed fibers are used for thermal insulation. These webs are sold under the tradename Thinsulate™ by Minnesota Mining and Manufacturing Corporation and are generally used as insulation for clothing articles. These webs are not irradiated nor are they heat treated to render them carbonaceous and are therefore highly flammable.

As is well known, meltblown materials have found utility in a broad range of applications. For example, it is known to use polymeric meltblown filaments in the preparation of battery separators, cable wrap, capacitor insulation paper, as wrapping materials, clothing liners, diaper liners, in the manufacture of bandages and sanitary napkins, and the like.

U.S. Pat. Nos. 4,837,076, 4,879,168 by McCullough et al, which are herein incorporated by reference, disclose crimped, irreversibly heat set, carbonaceous fibers which are derived from oxidatively stabilized polyacrylonitrile fibers. These patents disclose heat treatment conditions suitable to permanently heat set the fibers in an inert atmosphere to make the fibers carbonaceous. These heat treatment conditions can be used in the process of the present invention. These fibers, however, are traditionally spun textile fibers made from acrylic (PAN) which have been oxidatively stabilized and which contain from about 5 to 20 percent by weight oxygen.

Exposing polymeric materials to ionizing radiation to alter their properties is known. Methods of radiation include X-rays, gamma-rays and electron beam (or E-Beam) radiation. These kinds of radiation are all essentially equivalent. Under exposure to radiation, free radicals or other reactive species are generated in the polymeric material. Ionizing radiation, e.g. from an electron beam generator is known to create many complex and sometimes competing reactions. For example, electron beam radiation is known to induce crosslinking of acrylonitrile.

The electron beam radiation treatment is most easily carried out at ambient temperature. There is no obstacle, however, to the radiation treatment of the fibrous material at an elevated temperature, provided that the temperature is maintained below the temperature at which the polymeric material degrades or deteriorates.

The term "carbonaceous material" used herein is understood to mean that the carbon content of the material is greater than about 65% and less than 92%, the oxygen content is greater than 0 and less than 2%, preferably less than 1%, the nitrogen content is from about 5 to 30%, and the specific resistivity of the carbonaceous material is greater than $10^{-1}$ ohm-cm., more specifically from about $10^1$ up to about $10^{-10}$ ohm-cm, The term "carbonization" used herein is understood to mean that the carbon content of the irradiated acrylic polymeric precursor material has been increased as a result of an irreversible chemical reaction generally caused by heat treating the material in a nonoxidizing atmosphere to permanently heat set the material.

All percentages given herein are in percent by weight unless otherwise specified.

SUMMARY OF THE INVENTION

According to the present invention there is provided a novel method for preparing a carbonaceous material from a meltblown or spunbonded acrylic precursor material in the form of a multiplicity of fibers or microfibers that are self bonded to each other at their contact points. The precursor material is exposed to ionizing radiation to crosslink said material and is then heat treating in an inert atmosphere for a time and temperature sufficient to increase the carbon content of said irradiated precursor material to form said carbonaceous material. The carbonaceous material thus produced consists of a multiplicity of carbonaceous fibers that are integrally welded to each other at their contact points to form a continuous fibrous carbonaceous material generally in the form or a planar sheet, fabric, panel, web, mat, or the like. The carbonaceous material is further characterized by having a carbon content of from about 65% to less than about 92%, a nitrogen content of from about 5% to about 30%, an oxygen content of from greater than 0% to less than about 2%, preferably less than 1%, and a specific resistivity of from about $10^{-1}$ to about $10^{-10}$ ohm-cm.

The spunbonded and meltblown polymeric fibers and microfibers are subjected to ionizing radiation such as by electron beam irradiation, at a dose level of less than 10 megarads, preferably less than 2 megarads, more preferably from about 0.1 to 1.5 megarads. The effect of irradiation is to crosslink the fibrous polymeric precursor material and to stabilize the polymeric material for subsequent heat treatment in a non-oxidizing atmosphere and at a temperature and for a length of time sufficient to irreversibly convert the crosslinked precursor material to a carbonaceous material. It will be readily understood by persons skilled in the art that the temperature and length of time of the heat treatment can be varied to a substantial degree and is interdependent. For example, if the temperature is increased, the time of treatment can be correspondingly reduced. If the temperature is decreased, the length of treatment can be increased to obtain the desired degree of carbonization of the crosslinked precursor material. Specific haet treatment conditions useful to prepare the carbonaceous materials of the invention are described in U.S. Pat. Nos. 4,837,076 and 4,879,168, referenced herein above.

The carbonaceous material of the invention, when in the form of a batt, web or mat, generally has a bulk density of from about 100 to 300 cc/g (cubic cm per gram) or, conversely, 0.01 to 0.003 g/cc (grams per cubic cm), preferably from about 200 to 300 cc/g (0.005 to 0.003 g/cc). The carbonaceous batt, web or mat are particularly useful to provide high thermal insulation, with an insulation value of typically greater than 4 R/in, preferably from about 5 to 6 R/in, where R is measured in hr.ft$^2$.°F./BTU. If expressed in SI units (where $R_{si}$=mK/W), these values correspond to $R_{si}$/m of 1134; 1417, and 1701, respectively. The higher insulation values are obtained from the embodiments of the invention having high microfiber content.

The carbonaceous material of the invention, when in the form of a mat or web, or the like, can be used as ignition resistant thermal insulation, padding for carpeting, etc., as articles for personal use such as gloves, jackets, sleeping bags, etc. Sheets, foams, or films are particularly useful as furniture upholstery covers, curtains, comforters, mattress pads, etc.

It is therefore an object of the invention to provide a novel process for preparing an ignition resistant and/or fire-blocking, nonoxo-carbonaceous fibrous material utilizing a meltblown or spunbonded thermoplastic precursor material, where the precursor fibrous material is composed of a continuous matrix of self bonded polymeric fibers or microfibers. No additional means of bonding of the fibrous material, such as a polymeric binding agent, is necessary.

It is also an object of the invention to provide a process for preparing an ignition resistant and/or fire-blocking non-oxo-carbonaceous fibrous material which can be used alone or in combination with other fibers.

It is another object to provide an ignition resistant nonoxo-carbonaceous fibrous material which can be used as thermal insulation.

It is a further object of the invention to provide a fire-blocking nonoxo-carbonaceous fibrous sheet, board or panel for use in buildings, and the like.

Other objects and advantages of the invention will become more clearly understood from the drawing and the detailed description of the preferred embodiments.

DESCRIPTION OF THE PREFERRED EMBODIMENTS

Figure 1:
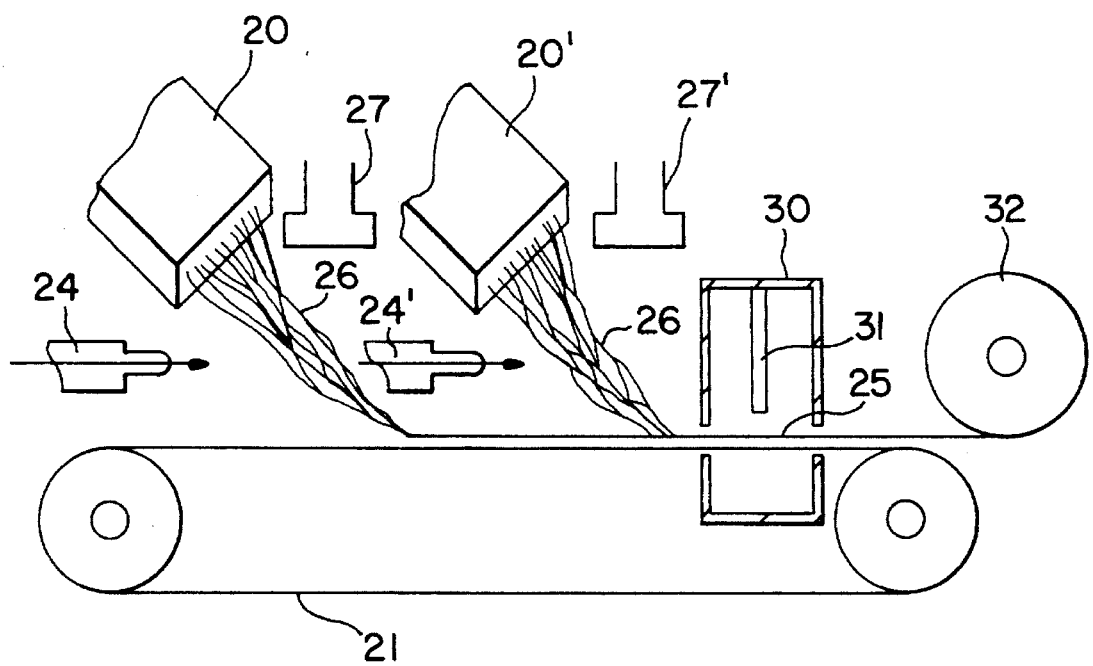
FIG. 1 is a schematic view of a preferred apparatus of the invention wherein a polymeric precursor material is made into a nonoxo-carbonaceous material.

In a prefered method of manufacturing, a multiplicity of polymeric precursor fibers are extruded from a conventional spunbonding or meltblowing apparatus and are deposited on a conveyor belt. Multiple extrusion heads can be spaced closely in series to build up a textile structure of the fibrous polymeric material to any desired thickness of up to 6 inches (15 cm), for example. The textile structure of the fibrous polymeric material so formed is then passed through a source of ionizing radiation, such as an electron beam, so as to stabilize the polymeric material by crosslinking. The irradiated fibrous material is then heat treated in an oven in an inert atmosphere. The heat treatment is preferably conducted by placing the fibrous precursor material on a support such as a belt so as to produce no tension on the fibrous material, to render the crosslinked fibrous material nonoxo-carbonaceous. The nonoxo-carbonaceous fibrous material is then collected on a take-up roll or in a container for further processing. While the process is preferably continuous and can be used beginning from the initial extrusion of the fibers or microfibers, it can also be readily adapted to batchwise production. That is, the process can begin by utilizing a creel of a spunbonded or meltblown fibrous polymeric precursor material, for example, polyacrylonitrile, which has been previously crosslinked by irradiation. The crosslinked fibrous precursor material can be stored and, when convenient, passed through an oven for heat treatment of the fibrous material in an inert atmosphere to obtain partial or full carbonization.

By partial carbonization is meant that the carbon content of the fibrous polymeric precursor material is increased to greater than 65% but less than 92% by heat treating in an inert atmosphere to cause permanent chemical change in the precursor material.

More particularly, FIG. 1 shows a typical production line for the preparation of a generally planar fibrous material 25, such as, for example, a web or mat, comprising a multiplicity of randomly oriented carbonaceous continuous microfibers which are integrally welded at their contact points. A multiplicity of polymeric microfibers 26 are extruded from a nozzle 20 of a meltblowing apparatus and are subjected to the influence of a dynamic flow of hot air from a jet 24, as described in U.S. Pat. No. 4,118,531, to form a fibrous precursor material in which the melt softened fibers are bonded to each other at their contact points. A multiplicity of contact points between individual fibers are formed due to the influence of the dynamic flow of hot air on the fibers as they transverse from the extrusion nozzle to an endless conveyor 21. The fibrous material 25 is conveyed by the endless belt conveyor 21 so as to be transported past a source 27 of electron beam radiation which is normally in a protective enclosure (not shown). The fibrous polymeric precursor material is then irradiated to crosslink and stabilize the polymeric material for the subsequent carbonizing heat treatment. One or more plies each composed of a multiplicity of the self bonded polymeric precursor fibers can be extruded over the initial fibrous material with additional nozzles and air jets followed by irradiation from further electron beam sources to form a multi-plied web or mat structure. The fibrous material is then moved into an oven 30 where it is heat treated to permanently heat set and render carbonaceous under the conditions described in U.S. Pat. Nos. 4,837,076 and 4,879,168. Preferably, the fibrous material 25 is subjected to a dynamic flow of inert non-oxidizing gas during heat treatment passing from nozzle 31 through the fibrous material, thereby improving the tenacity of the microfibers by removing interstitial oxygen from the fibrous material. Preferably, the inert non-oxidizing gas is nitrogen.

The fibrous material of the invention, preferably in the form of one or more plies, can be supplied in any desired thickness depending on the particular use to be made of the web or mat and can have a thickness from about 4 to 150 millimeters or greater. The density of the fibrous material can also vary widely depending on the particular uses to which the fibrous material is applied. Generally, the fibrous material has a density of at least 100 cubic centimeters/gram (cc/g).

The nonoxo-carbonaceous fibrous material of the invention can be produced into an ignition resistant insulation that meets the performance requirements as described in U.S. Federal Test Method FTM 5903. Insulation materials can also be formed from the carbonaceous material of the invention having fire blocking characteristics that meet the performance requirements as described in 14 CFR 25 Appendix F, Pt. III of the FAA cargo liner fireblock test and the U.S. Navy 30 minute 500,000 BTU, 2230° F. propane burner test for fire zone protection for a ship's bulkheads.

In accordance with a further embodiment of the invention, the fibrous nonoxo-carbonaceous material can be thermally bonded with a thermoplastic binder and then subjected to heat and pressure to form a flexible or rigid structural fireblocking panel or board.

In accordance with a further embodiment of the present invention, a ceramic and/or metallic coating can be formed on the nonoxo-carbonaceous material. The coated nonoxo-carbonaceous material can advantageously be used under oxidizing and high temperature applications wherein an uncoated material could otherwise not be used satisfactorily. The ceramic materials which can be utilized in the present invention are described in U.S. Pat. No. 4,902,563 issued on Feb. 20, 1990 to McCullough et al which is incorporated herein by reference.

The thickness and amount of coating applied to the carbonaceous material should be sufficient such that the surface coating substantially insulates the microfibrous substrate from the oxygen-containing atmosphere, i.e., such that the coating exposed to the oxygen-containing atmosphere protects the carbonaceous material from oxidation. The thickness and amount of coating on the carbonaceous material will depend on the form in which the material is used and the desired application for the microfibrous carbonaceous material. For example, the coating thickness will depend on whether the carbonaceous material is a single ply which can have a coating thickness of about 1 micron or a batting which can have a coating thickness of about 10–100 microns.

In those nonoxo-carbonaceous materials of the invention that are used as fire barriers, conformal silicone compounds, such as DC1-2577 and commercially available from the Dow Corning Corporation, can be used as coatings on the carbonaceous material to synergistically improve their fire barrier performance as described in U.S. Pat. No. 5,024,877, issued Jun. 18, 1991 to McCullough et al, which is incorporated herein by reference. More specifically, DC1-2577 is a siloxane class dimethylphenylmethoxysilane supplied as a liquid comprising about 73% oligomeric solids in about 24% toluene and also containing about 3% excess trimethyoxysilane. This liquid is dilutable using standard dry aromatic solvents such as toluene, xylene or mesetylene or with chlorinated solvents such as 1,1,1-trichloroethane. This material cures in air or at elevated temperature by hydrolysis to an elastoplastic silicone resin.

The precursor polymeric material used to prepare the carbonaceous material of the invention is derived from an acrylic polymer. The acrylic polymer is selected from one or more of the following: acrylonitrile based homopolymers, copolymers and terpolymers. The copolymers contain at least about 85 mole percent of acrylonitrile units and up to 15 mole percent of one or more monovinyl units.

Examples of vinyl monomers copolymerizable with acrylonitrile include methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid, and the salts thereof; vinylsulfonic acid and the salts thereof.

The nonoxo-carbonaceous fibrous material of the invention derived from an acrylic precursor material can be classified according to nitrogen content and electrical specific resistivity. The nonoxo-carbonaceous material has a nitrogen content from about 5 to 30%, preferably from 8 to 22%. Because the precursor fibrous material is stabilized or crosslinked by irradiation, it has substantially no oxygen units, i.e. less than 2%, preferably less than 1%.

In a first group, the nonoxo-carbonaceous material is partially carbonized and has a carbon content of greater than 65% but less than 75% and is electrically nonconductive and does not possess any or little electrostatic dissipating characteristics, i.e., the material is not able to or poorly does dissipate an electrostatic charge. When an acrylic precursor material is used, it has a nitrogen content of from about 18 to 22% and a specific resistivity of greater than $10^4$ ohm-cm.

In a second group, the nonoxo-carbonaceous material is classified as having low electrical conductivity, i.e. it is partially electrically conductive and has a carbon content of greater than 75% but less than 92%. When the nonoxo-carbonaceous material is derived from irradiated acrylic precursor material and has a low conductivity (high resistivity), it possesses a percentage nitrogen content of from about 8 to 20%, preferably from about 10 to 18.8%, and an electrical specific resistivity of greater than $10^{-1}$ ohm-cm.

Having thus broadly described the present invention and a preferred embodiment thereof, it is believed that the same will become even more apparent by reference to the following examples. It will be appreciated, however, that the examples are presented solely for purposes of illustration and should not be construed as limiting the invention.

EXAMPLE 1

An ignition resistant carbonaceous web or mat of the invention is made using a modified melt-blown process and an apparatus similar to that described in U.S. Pat. No. 4,118,531. The apparatus is manufactured by J&M Laboratories, Gainesville, Ga. The molten polymer (oligomerized acrylonitrile) is extruded through a die, which had very fine holes of a diameter of the order of 0.05 mm and spaced at a distance of from 8–15 holes per centimeter. As soon as the polymer emerged from the die, it is drawn away by a stream of high velocity hot air. The temperature of the air is about 50° C. greater than the die temperature. This web is then irradiated at less than 1.5 megarads to crosslink the polymer material of the web. The crosslinked polymeric web is then heat treated in a non-oxidizing atmosphere at 750° C. to permanently heat set the polymer and render the polymer carbonaceous. The resulting carbonaceous web is an essentially continuous structure in which the carbonaceous fibers are bonded to each other and carbonized to form a very stable and cohesive structure. The resulting material has a nitrogen content of 8%, and an oxygen content of less than 1%. The carbonaceous web is tested for ignition resistance by both FTM 5903 and FAR 25.853-b vertical burn tests. The results for each test are the same, there is no afterburn, and a char length of less than 1 in (2.5 cm) is formed with no droppings. The carbonaceous material of the web has a specific resistivity of about $10^1$ ohm-cm and a k value of about 0.28 BTU.in/(hr.ft$^2$.°F.).

EXAMPLE 2

An ignition resistant carbonaceous web of the invention is made using a modified meltblown process and an apparatus similar to that of U.S. Pat. No. 4,118,531. The apparatus is manufactured by J&M Laboratories, Gainesville, Ga. Molten polyacrylonitrile is extruded through a die having a plurality of orifices, each having a diameter of 0.4 mm. The orifices are equally spaced from each other with 10 orifices per inch (4 orifices/cm). As soon as the polymer emerges from the die, it is drawn away by a stream of hot air contacting the emerging polymer at the exit end of the orifices. The temperature of the air stream at the contact point with the polymer streams emerging from the orifices is the same as the die temperature. The web is then transported to a source of electron beam radiation where it is irradiated at an intensity of about 1.5 megarads to crosslink the polymeric material of the web. The web is then heat treated in an inert atmosphere under a dynamic flow of nitrogen passing through the batting under the conditions described in U.S. Pat. No. 4,879,168 at a temperature of 550° C. to be rendered carbonaceous. The carbonaceous web is electrically non-conductive and has a specific resistivity of about $10^6$ ohm-cm and a k value of about 0.26 BTU.in/(hr.ft$^2$.°F.). The resulting carbonaceous web is an essentially continuous structure in which the carbonaceous fibers are bonded and carbonized at the contact points to form a very stable and cohesive structure. The nitrogen content of the carbonaceous material is 18.8% and the oxygen content is less than 1%.

EXAMPLE 3

A web is prepared by using the same polymer to that used in Example 2. The meltblowing apparatus is operated at the same conditions previously described except that the air flow rate is increased by about 20 percent during meltblowing. The increase in air flow causes an increase in the draw or attenuation of the fibers, resulting in an increase in the molecular orientation of the meltblown filaments, thereby increasing the tenacity of the filaments. The webbing that is produced contained microdenier fibers having an average diameter of about 5 microns which are somewhat smaller in diameter than the fibers produced in Example 2. The webbing produced in this example is then irradiated at a dosage of 2 megarads and heat treated similar to the batting of Example 2. The k value of the webbing improves from about 0.26 to 0.20 BTU.in/(hr.ft$^2$.°F.), which is indicative of the fact that the lower the k value, the higher the degree of thermal insulation.

EXAMPLE 4

A carbonaceous web prepared by the same procedure used in Example 2 is placed on a conveyor belt. A polyester binder resin comprising 15% by weight, based on the total weight of the web, in the form of a powder is distributed throughout the web using equipment produced by Nordsen Equipment Co. Samples of the web with the polyester binder are compressed as follows: Sample A is run through a set of calendar rolls which are preheated to a temperature of 150° C. and produce a densified film or sheet material; Sample B is sandwiched between two aluminum platens and placed in a press which is preheated to a temperature of 150° C. and is compressed for 2 minutes at 100 psi pressure (689 kPa), removed from the press and is allowed to cool for 10 minutes to from a rigid compressed board. Sample A and sample B are tested for fire blocking characteristics as described in 14 CFR 25 Appendix F, Pt. III FAA cargo liner fireblock test and the U.S. Navy 30 minute 500,000 BTU, 2230° F. propane burner test for fire zone protection of a ship's bulkhead. Both samples successfully pass both tests demonstrating their satisfactory fire-blocking performance in the form of densified structures under relatively severe test conditions. These excellent performance results were obtained with thin light weight structures.

What is claimed:

1. A method for preparing an ignition resistant carbonaceous material from an acrylic precursor material, comprising the steps of:
    1) exposing a meltblown or spunbonded acrylic precursor material to ionizing radiation at an intensity of from 0.1 to 10 megarads so as to crosslink said acrylic material, and then
    2) heat treating said irradiated acrylic material in an inert atmosphere for a time and temperature sufficient to increase the carbon content of said irradiated material to form said carbonaceous material having a carbon content of from about 65% to less than about 92%, an oxygen content of less than about 2%, and a specific resistivity of from about $10^{-1}$ to about $10^{10}$ ohm-cm.

2. The method of claim 1, wherein said meltblown or spunbonded acrylic precursor material consists of a multiplicity of fibers, and including the step of assembling said multiplicity of fibers into at least one ply of a web, mat or batt.

3. The method of claim 1, wherein said radiation is conducted at an intensity of less than 10 megarads.

4. The method of claim 3, wherein said ionizing radiation is conducted at an intensity of from about 0.1 to 1.5 megarads.

5. The method of claim 1, including the step of subjecting said irradiated acrylic precursor material to a dynamic flow of a non-oxidizing gas during heat treatment.

6. The method of claim 1, wherein said ionizing irradiation is in the form of electron radiation.

7. The method of claim 1, wherein said carbonaceous material has an oxygen content of less than about 1% and a nitrogen content of from about 5% to about 30%.

8. A method for preparing a structural fire blocking panel or board from an acrylic precursor material, comprising the steps of
    1) exposing a meltblown or spunbonded acrylic precursor material to ionizing radiation at an intensity of from 0.1 to 10 megarads so as to crosslink said acrylic material,
    2) heat treating said irradiated acrylic material in an inert atmosphere for a time and temperature sufficient to increase the carbon content of said irradiated material to form said carbonaceous material having a carbon content of from about 65% to less than about 92%, an oxygen content of less than about 2%, and a specific resistivity of from about $10^{-1}$ to about $10^{10}$ ohm-cm.
    3) thermally bonding said carbonaceous material with a thermoplastic binder, and then
    4) subjecting the bonded carbonaceous material to heat and pressure to form said structural fireblocking panel or board.

9. The method of claim 8, wherein said meltblown or spunbonded acrylic precursor material consists of a multiplicity of fibers, and including the step of assembling said multiplicity of fibers into at least one ply of a web, mat or batt.

10. The method of claim 8, wherein said carbonaceous material has an oxygen content of less than about 1% and a nitrogen content of from about 5% to about 30%.

11. A method for preparing an ignition resistant carbonaceous material from an acrylic precursor material, comprising steps of:
    1) meltblowing or spunbonding acrylic material into a web;
    2) exposing said meltblown or spunbonded acrylic material to ionizing radiation at an intensity of from 0.1 to 10 megarads so as to crosslink said acrylic material, and then
    3) heat treating said irradiated acrylic material in an inert atmosphere for a time and temperature sufficient to increase the carbon content of said irradiated material to form said carbonaceous material having a carbon content of from about 65% to less than about 92%, an oxygen content of less than about 2%.

\* \* \* \* \*